United States Patent
Glover et al.

(10) Patent No.: US 8,489,823 B2
(45) Date of Patent: Jul. 16, 2013

(54) EFFICIENT DATA PREFETCHING IN THE PRESENCE OF LOAD HITS

(75) Inventors: Clinton Thomas Glover, Austin, TX (US); Colin Eddy, Austin, TX (US); Rodney E. Hooker, Austin, TX (US); Albert J. Loper, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 13/535,152

(22) Filed: Jun. 27, 2012

(65) Prior Publication Data

US 2012/0272003 A1  Oct. 25, 2012

Related U.S. Application Data

(62) Division of application No. 12/763,938, filed on Apr. 20, 2010, now Pat. No. 8,234,450.

(60) Provisional application No. 61/224,792, filed on Jul. 10, 2009.

(51) Int. Cl.
*G06F 12/08* (2006.01)

(52) U.S. Cl.
USPC ............ 711/146; 711/122; 711/E12.033; 711/E12.024

(58) Field of Classification Search
USPC .......... 711/118, 141, 145, 119, 120, E12.001, 711/146, E12.024, E12.026, E12.033; 710/126, 710/129, 240
See application file for complete search history.

(56) References Cited

U.S. PATENT DOCUMENTS

| | | | |
|---|---|---|---|
| 6,065,098 A * | 5/2000 | Lippert | 711/122 |
| 6,275,885 B1 * | 8/2001 | Chin et al. | 711/146 |
| 6,345,340 B1 * | 2/2002 | Arimilli et al. | 711/141 |
| 6,430,654 B1 * | 8/2002 | Mehrotra et al. | 711/118 |
| 7,188,215 B2 | 3/2007 | Hooker | |
| 7,769,955 B2 | 8/2010 | Ozer et al. | |
| 7,908,439 B2 | 3/2011 | Brunheroto et al. | |
| 8,078,806 B2 | 12/2011 | Diefendorff | |
| 2007/0005909 A1 | 1/2007 | Cai et al. | |
| 2007/0156971 A1 * | 7/2007 | Sistla et al. | 711/141 |
| 2012/0272004 A1 | 10/2012 | Glover et al. | |

FOREIGN PATENT DOCUMENTS

WO  WO 2005/119465  * 12/2005

* cited by examiner

*Primary Examiner* — Pierre-Michel Bataille
(74) *Attorney, Agent, or Firm* — E. Alan Davis; James W. Huffman

(57) ABSTRACT

A microprocessor configured to access an external memory includes a first-level cache, a second-level cache, and a bus interface unit (BIU) configured to interface the first-level and second-level caches to a bus used to access the external memory. The BIU is configured to prioritize requests from the first-level cache above requests from the second-level cache. The second-level cache is configured to generate a first request to the BIU to fetch a cache line from the external memory. The second-level cache is also configured to detect that the first-level cache has subsequently generated a second request to the second-level cache for the same cache line. The second-level cache is also configured to request the BIU to refrain from performing a transaction on the bus to fulfill the first request if the BIU has not yet been granted ownership of the bus to fulfill the first request.

10 Claims, 5 Drawing Sheets

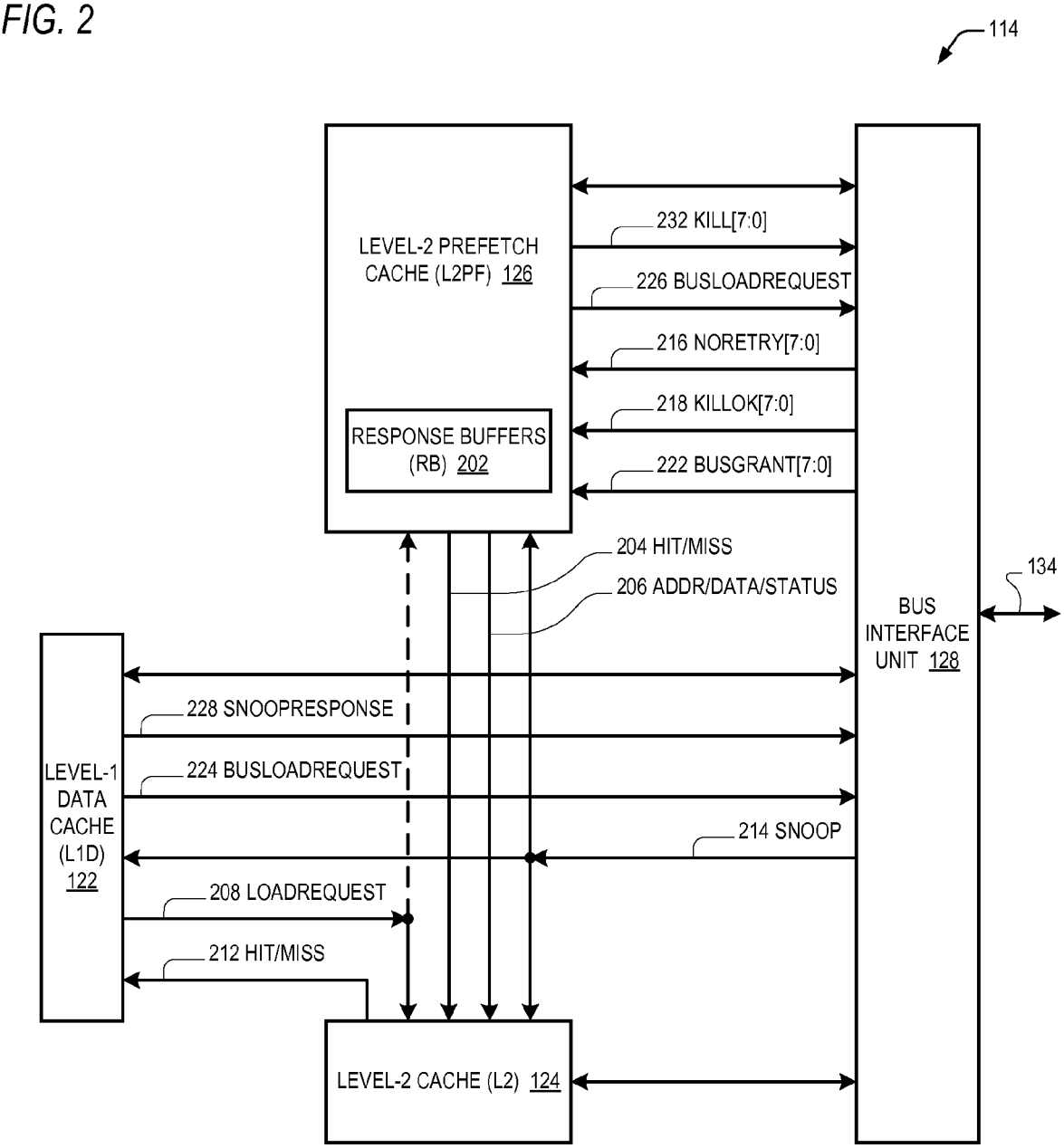

| | SNOOP HITS | NORETRY | L1D LOADREQUEST | L2PF HIT/MISS |
|---|---|---|---|---|
| 1 | (1) | (2) | (3) | MISS |
| 2 | (1) | (3) | (2) | MISS |
| 3 | (2) | (1) | (3) | MISS |
| 4 | (2) | (3) | (1) | MISS |
| 5 | (3) | (1) | (2) | HIT |
| 6 | (3) | (2) | (1) | HIT |

Columns 1–3 grouped under ORDER OF EVENTS; column 4 under L2PF RESPONSE. Figure label 400.

US 8,489,823 B2

EFFICIENT DATA PREFETCHING IN THE PRESENCE OF LOAD HITS

CROSS REFERENCE TO RELATED APPLICATION(S)

This application is a divisional application of U.S. Non-Provisional Application Ser. No. 12/763,938, filed Apr. 20, 2010, which claims priority based on U.S. Provisional Application Ser. No. 61/224,792, filed Jul. 10, 2009, entitled EFFICIENT DATA PREFETCHING IN THE PRESENCE OF LOAD HITS, each of which is hereby incorporated by reference in its entirety.

FIELD OF THE INVENTION

The present invention relates in general to the field of microprocessors, and particularly to the prefetching of data in cache memories thereof.

BACKGROUND OF THE INVENTION

The performance benefits of prefetching data and/or instructions from a system memory into a cache memory of a microprocessor are well-known, and as the disparity between memory access latency and the microprocessor core clock frequency continue to increase, those benefits become more important. However, the generation of prefetch requests by the microprocessor places additional load upon the limited resources of the microprocessor that are also needed by normal load and store requests, such as the external bus of the microprocessor, the bus interface unit that interfaces the microprocessor to the bus, and the various cache memories of the microprocessor. Thus, it is important to design the prefetcher in a way that efficiently utilizes those resources.

BRIEF SUMMARY OF INVENTION

In one aspect the present invention provides a microprocessor configured to access an external memory. The microprocessor includes a first-level cache, a second-level cache, and a bus interface unit (BIU) configured to interface the first-level and second-level caches to a bus used to access the external memory. The BIU is configured to prioritize requests from the first-level cache above requests from the second-level cache. The second-level cache is configured to generate a first request to the BIU to fetch a cache line from the external memory. The second-level cache is also configured to detect that the first-level cache has subsequently generated a second request to the second-level cache for the same cache line. The second-level cache is also configured to request the BIU to refrain from performing a transaction on the bus to fulfill the first request if the BIU has not yet been granted ownership of the bus to fulfill the first request.

In another aspect, the present invention provides a method for caching data in a microprocessor configured to access an external memory, the microprocessor having a first-level cache, a second-level cache, and a bus interface unit (BIU) configured to interface the first-level and second-level caches to a bus used to access the external memory. The method includes the second-level cache generating a first request to the BIU to fetch a cache line from the external memory. The method also includes the second-level cache detecting that the first-level cache has subsequently generated a second request to the second-level cache for the same cache line. The method also includes the second-level cache requesting the BIU to refrain from performing a transaction on the bus to fulfill the first request if the BIU has not yet been granted ownership of the bus to fulfill the first request.

In yet another aspect, the present invention provides a computer program product encoded in at least one non-transitory computer readable storage medium for use with a computing device, the computer program product comprising computer readable program code embodied in said medium for specifying a microprocessor configured to access an external memory. The computer readable program code includes first program code for specifying a first-level cache. The computer readable program code also includes second program code for specifying a second-level cache. The computer readable program code also includes third program code for specifying a bus interface unit (BIU) configured to interface the first-level and second-level caches to a bus used to access the external memory. The BIU is configured to prioritize requests from the first-level cache above requests from the second-level cache. The second-level cache is configured to generate a first request to the BIU to fetch a cache line from the external memory. The second-level cache is also configured to detect that the first-level cache has subsequently generated a second request to the second-level cache for the same cache line. The second-level cache is also configured to request the BIU to refrain from performing a transaction on the bus to fulfill the first request if the BIU has not yet been granted ownership of the bus to fulfill the first request.

BRIEF DESCRIPTION OF THE DRAWINGS

FIG. 2 is a block diagram illustrating the memory subsystem of the microprocessor of FIG. 1.

FIG. 3 is a block diagram illustrating relevant fields of each response buffer of FIG. 2.

DETAILED DESCRIPTION OF THE INVENTION

Figure 1:
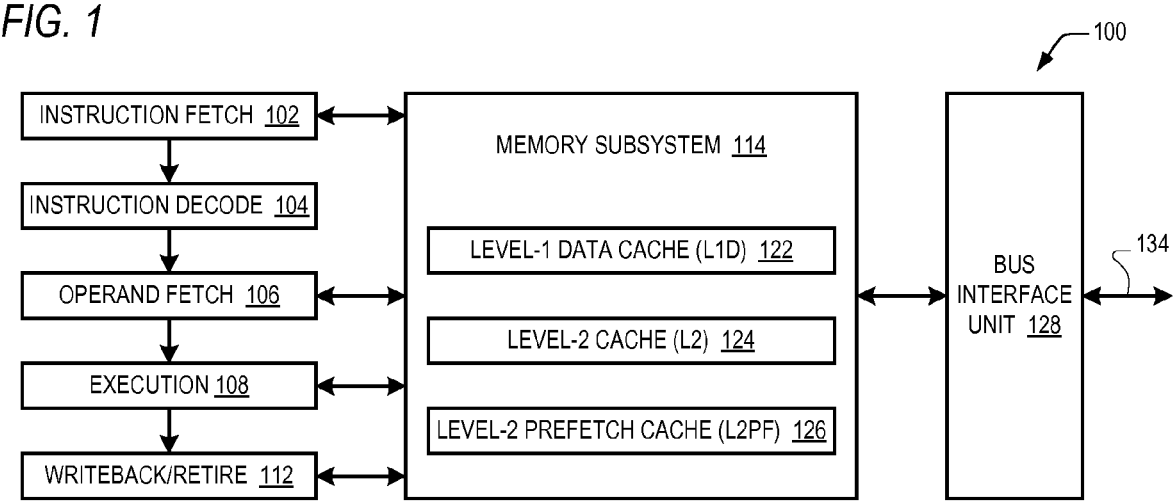
FIG. 1 is a block diagram illustrating a microprocessor.

Referring now to FIG. 1, a block diagram illustrating a microprocessor 100 according to the present invention is shown. The microprocessor 100 includes well-known instruction fetch 102, instruction decode 104, operand fetch 106, execution 108, and result writeback/instruction retire 112 stages. Each stage shown may include multiple stages. In one embodiment, the microprocessor 100 is a superscalar out-of-order execution/in-order retirement microprocessor. The microprocessor 100 also includes a bus interface unit 128 for interfacing the microprocessor 100 to an external bus 134 for accessing system memory and peripheral devices. In one embodiment, the bus 134 conforms substantially to the bus protocol specified by one of the various Intel® Pentium® microprocessors. The microprocessor 100 also includes a memory subsystem 114, which includes a level-1 data cache memory (L1D) 122, a level-2 cache memory (L2) 124, and a level-2 prefetch cache memory (L2PF) 126.

Referring now to FIG. 2, a block diagram illustrating the memory subsystem 114 of the microprocessor 100 of FIG. 1 according to the present invention is shown. The memory subsystem 114 includes the L1P cache 122, L2 cache 124, and L2PF cache 126 each coupled to the bus interface unit 128 of FIG. 1. The L2PF cache 126 generates busLoadRequests 226 to the bus interface unit 128 to prefetch cache lines into its cache memory. The L2PF 126 generates the L2PF busLoadRequests 226 in response to prefetch requests generated in response to the execution of software prefetch instructions by the execution units 108 and/or hardware prefetch requests generated within the microprocessor 100 itself.

The L2PF cache 126 includes a plurality of response buffers (RB) 202 into which the cache lines are loaded from the bus 134 for intermediate storage until they can be retired into the L2PF cache 126 or provided to the L2 cache 124. In one embodiment, there are eight response buffers 202. FIG. 3 is a block diagram illustrating relevant fields of each response buffer 202 of FIG. 2.

When the L2PF 126 allocates a response buffer 202 prior to issuing a busLoadRequest 226, the L2PF 126 stores the address of the cache line to be prefetched into an address field 302 of the allocated response buffer 202. The prefetched cache line data will be retired either to the L1P cache 122 or L2PF cache 126.

The L1P cache 122 issues a L1P loadRequest 208 to the L2 cache 124 to load a cache line from the L2 cache 124. The L1P loadRequest 208 signal is also provided to the L2PF 126. The L2PF 126 sets a L1DLoadCollide field 306 of a response buffer 202 if a loadRequest 208 generated by the L1P cache 122 collides with a valid value in the address 302 field.

The bus interface unit 128 generates snoop requests 214 in response to transactions initiated by external agents on the bus 134 or in response to certain transactions generated internally by the caches of the microprocessor 100. The snoop requests 214 are provided to the L1P cache 122, L2 cache 124, and L2PF 126. The L2PF 126 sets a snoopHit field 308 of a response buffer 202 if a snoop request 214 collides with a valid value in the address 302 field.

The bus interface unit 128 provides a noRetry signal 216 associated with each of the response buffers 202 to the L2PF 126. The bus interface unit 128 decodes encoded bits during the Response phase on the bus 134 that indicate whether the bus interface unit 128 is now committed to completing the current transaction. That is, the transaction will not be retried. Since the transaction will not be retried, the bus interface unit 128 asserts the noRetry signal 216 associated with the response buffer 202, and the L2PF 126 responsively sets a noRetry field 312 within the response buffer 202.

The bus interface unit 128 also provides a busGrant signal 222 associated with each of the response buffers 202 to the L2PF 126. The bus interface unit 128 asserts the busGrant signal 222 associated with a response buffer 202 when the bus interface unit 128 is granted ownership of the bus 134 to perform the transaction to fetch the cache line specified by the address field 302 of the response buffer 202, and the L2PF 126 responsively sets a busGrant field 314 within the response buffer 202.

The L2PF 126 provides a kill signal 232 to the bus interface unit 128 associated with each of the response buffers 202. The L2PF 126 asserts the appropriate kill signal 232 to instruct the bus interface unit 128 to refrain from performing a bus transaction on the bus 134 to fetch the cache line specified by the response buffer 202 or to terminate the transaction if it has already started. The bus interface unit 128 provides a killOK signal 218 associated with each of the response buffers 202 to the L2PF 126. The bus interface unit 128 asserts the killOK signal 218 associated with a response buffer 202 up until the time when the transaction is so far along that the bus interface unit 128 may no longer terminate the transaction, in response to which the L2PF 126 clears a killOK field 316 within the response buffer 202.

The L1P cache 122 generates a busLoadRequest signal 224 to request the bus interface unit 128 to fetch a cache line into the L1P cache 122. Additionally, the L1P cache 122 generates a snoopResponse signal 228 to the bus interface unit 128 in response to the snoop requests 214 generated by the bus interface unit 128. The L2 cache 124 generates a hit/miss signal 212 to the L1P cache 122 to indicate whether the L1P loadRequest 208 hit or missed in the L2 cache 124. The L2PF 126 generates a hit/miss signal 204 to the L2 cache 124 to indicate whether the L1P loadRequest 208 hit or missed in the L2PF cache 126. Finally, the L2PF cache 126 provides data and cache line status 206 to the L2 cache 124.

In one embodiment, the bus interface unit 128 prioritizes requests from the L1P 122 with a higher priority than requests from the L2PF 126. Therefore, generally, it is desirable to de-couple L1P 122 loads and L2PF 126 loads as much as possible so that the L1P 122 loads can make their bus requests at their higher priority. In particular, the memory subsystem 114 does this when an L2PF 126 busLoadRequest 226 is hit by both a snoop 214 and an L1P loadRequest 208, as indicated by true values of the snoopHit 308 bit and L1DLoadCollide bit 306, respectively, of the response buffer 202 associated with the L2PF 126 busLoadRequest 226. More specifically, if the bus interface unit 128 snoops 214 an L2PF 126 busLoadRequest 226, the response to the L1P cache 122 is a MISS unless the Response Phase has transpired on the bus 134. A true value of the noRetry bit 312 of the response buffer 202 associated with the L2PF 126 busLoadRequest 226 indicates that the Response Phase has transpired on the bus 134. Since the snooping agent is going to modify the cache line prefetched by the L2PF 126, it is more efficient to allow the L1P cache 122 to initiate a busLoadRequest 224 for the updated cache line as soon as possible. That is, returning the MISS to the L1P 122 immediately empowers the L1P 122 to start the L1P busLoadRequest 224 for the updated data as soon as possible. This is shown in rows 1 through 4 of FIG. 4 and blocks 502 through 512 of FIG. 5. (Block 508 of FIG. 5 assumes that the snoop 214 and L1P loadRequest 208 missed in the L2 cache 124, also.)

Figures 4, 5:
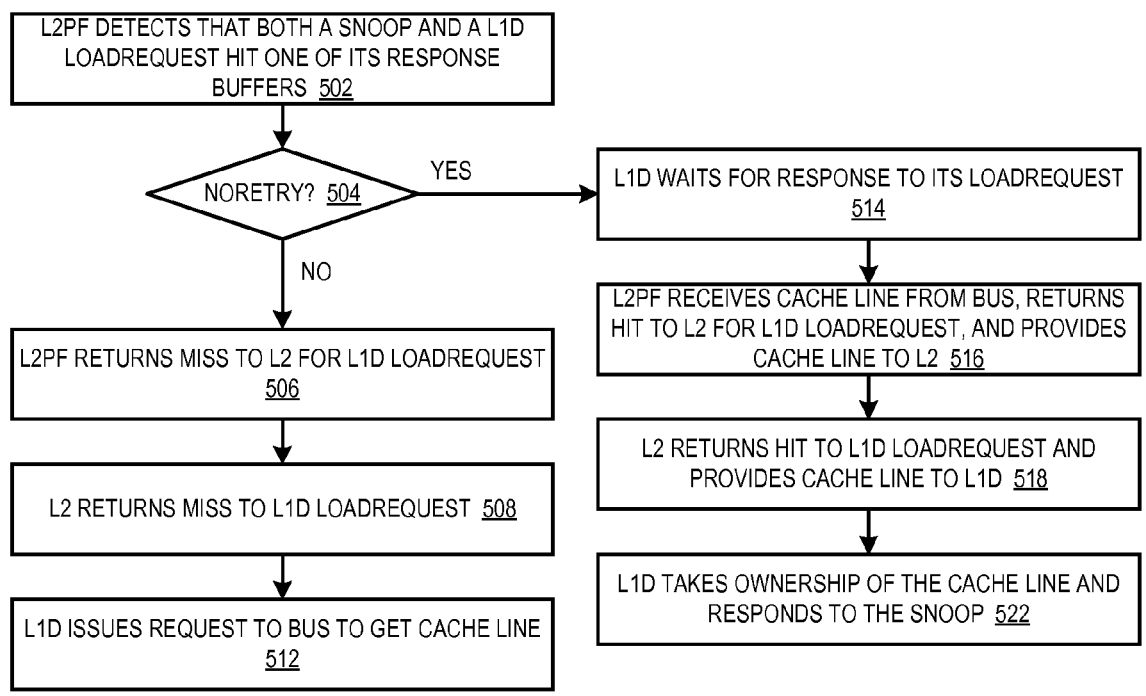
FIG. 4 is a table illustrating responses by the level-2 prefetch cache of FIG. 2.
FIGS. 5 through 7 are flowcharts illustrating operation of the memory subsystem of FIG. 2.

As shown in rows 5 and 6 of FIG. 4 and blocks 514 through 522 of FIG. 5, in the event that the snoop 214 hit occurs after the Response Phase, the L1P 122 waits for the data fetched by the L2PF 126 busLoadRequest 226. In this case the L1P 122 owns the line, sinks the data, and responds to the snoop 214. This is suitable because the data tenure on the bus 134 typically occurs just after the Response Phase.

Stated alternatively, the hit/miss response 204 from the L2PF 126 (and the subsequent hit/miss response 212 from the L2 cache 124 to the L1P 122) is a function of the L1DLoadCollide 306, snoopHit 308, and noRetry 312 state information stored in the associated response buffer 202.

Figure 6:
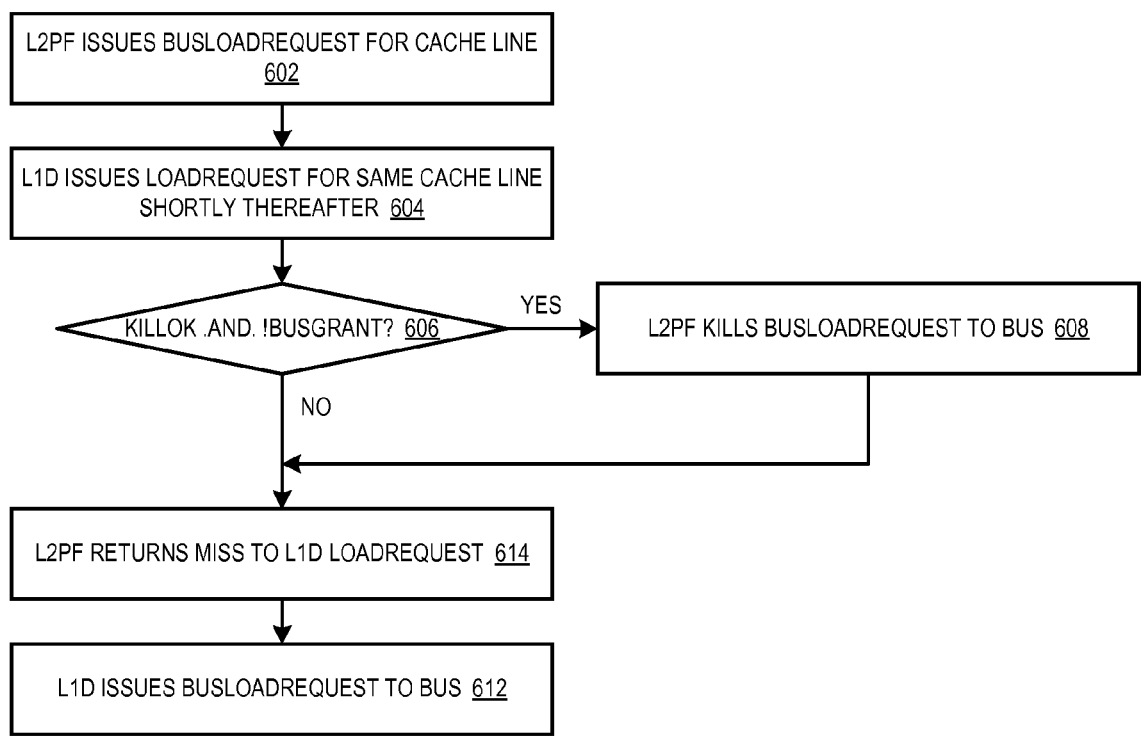

When executing L2PF 126 busLoadRequests 226, bus 134 bandwidth can be wasted due to colliding L1P loadRequests 208 which closely follow L2PF 126 busLoadRequests 226, as indicated by a true value on the associated L1DLoadCollide bit 306. Such requests result in duplicated bus 134 transactions to fetch the same cache line. The embodiment described in FIG. 6 addresses this problem by terminating such L2PF 126 busLoadRequests 226 which have not been granted the bus 134, as indicated by a false value on the associated busGrant bit 314. That is, if an L1P loadRequest 208 collides with an L2PF 126 busLoadRequest 226 which has not been granted the bus 134, then the L2PF 126 asserts the associated kill signal 232 to terminate the busLoadRequest 226, as shown in FIG. 6. This allows the higher priority L1P 122 busLoadRequest 224 to be the single bus 134 transaction for the cache line.

Stated alternatively, the termination of the L2PF 126 busLoadRequest 226 is a function of the L1DLoadCollide 306, busGrant 314, and killOK 316 state information stored in the associated response buffer 202. Again, terminating the L2PF 126 busLoadRequest 226 as soon as possible allows the L2PF 126 to return a MISS to the L2 cache 124 sooner, which in turn advantageously allows the L1P 122 to generate its busLoadRequest 224 sooner, which has a higher priority within the bus interface unit 128. Moreover, another important benefit of terminating the L2PF 126 busLoadRequest 226 is to avoid performing two loads of the same cache line on the bus 134, i.e., to reduce the amount of traffic on the bus 134.

Clearly the L2PF 126 must not cause incoherency. For instance, incoherency would result if L2PF 126 returned data with an Exclusive status to the L1P 122 while the same cache line had Modified status in the L2 cache 124. A conventional solution to avoid incoherency is for the L2PF 126 to query the L2 cache 124 before executing a prefetch of a cache line and to not fetch if the query hits in the L2 cache 124. That is, a conventional solution is to simply disallow the same cache line to be present in both the L2 cache 124 and the L2PF cache 126. However, the conventional solution introduces latency in an L2PF 126 prefetch and requires additional logic.

Figure 7:
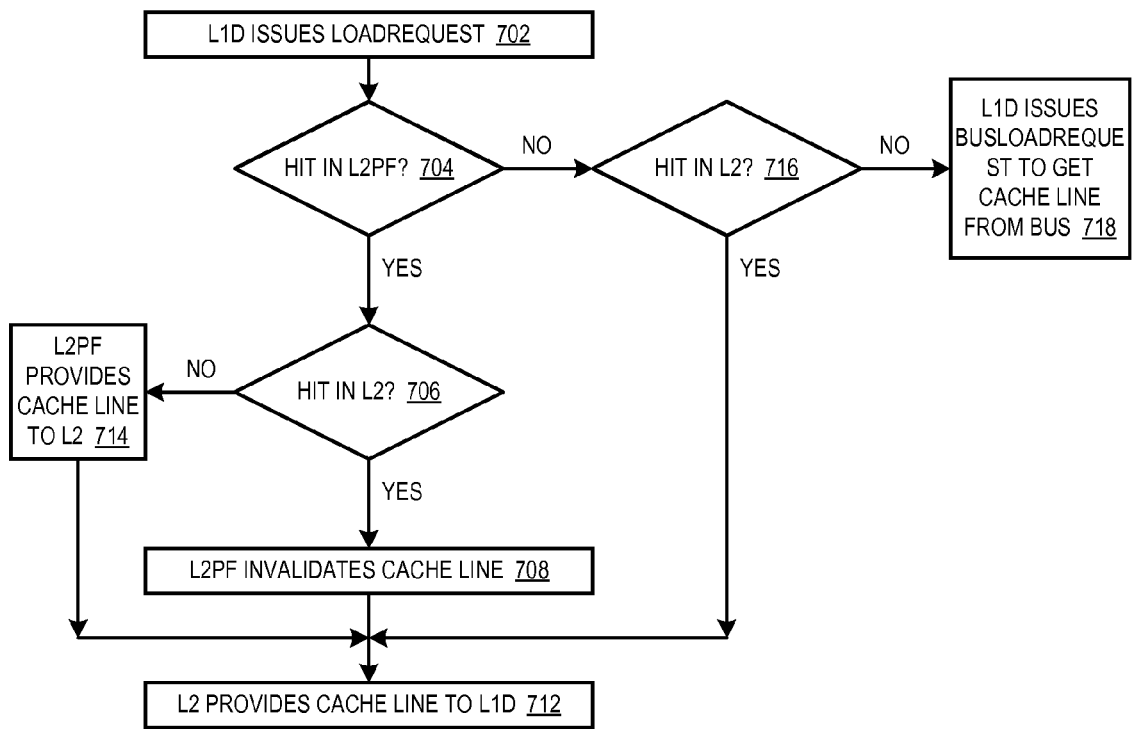

The embodiment described in FIG. 7 eliminates the tag query altogether by combining the L2 cache 124 and L2PF cache 126 responses to an L1P loadRequest 208. Specifically, if an L1P 122 loadRequest 208 hits in both the L2PF 126 and L2 cache 124, the L2 cache 124 supplies the data in response to the L1P 122 loadRequest 208. This insures that if there is Modified data in the L2 cache 124, then the L2 cache 124 data will be returned. Furthermore, the L2PF 126 invalidates the data if the L1P loadRequest 208 hits in both the L2PF cache 126 and the L2 cache 124. This operation of the memory subsystem 114 is shown in FIG. 7.

The combining of the L2 cache 124 and L2PF cache 126 responses to an L1P loadRequest 208 is accomplished by designing the pipelines in both the L2PF 126 and L2 cache 124 such that they are staged identically and process the same L1P loadRequest 208 in the same sequence. In particular, the L2PF 126 sees the L1P 122 loadRequest 208, as shown in FIG. 2, and sees when the L2 cache 124 is going to process it.

Although embodiments are described in which there exists a separate prefetch cache memory associated with the prefetcher 126, other embodiments are contemplated in which there does not exist a separate prefetch cache memory associated with the prefetcher 126 and the prefetcher 126 retires the cache lines it prefetches into the response buffers 202 into another cache memory of the microprocessor, such as the L2 cache 124, L1P 122 and/or a level-1 instruction cache.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to access an external memory, the microprocessor comprising:
    a first-level cache;
    a second-level cache; and
    a bus interface unit (BIU), configured to interface the first-level and second-level caches to a bus used to access the external memory, wherein the BIU is configured to prioritize requests from the first-level cache above requests from the second-level cache;
    wherein the second-level cache is configured to:
        generate a first request to the BIU to fetch a cache line from the external memory;
        detect that the first-level cache has subsequently generated a second request to the second-level cache for the same cache line;
        request the BIU to refrain from performing a transaction on the bus to fulfill the first request if the BIU has not yet been granted ownership of the bus to fulfill the first request;
    wherein the request to refrain from performing the transaction includes a request to terminate the transaction on the bus if the BIU has already been granted ownership of the bus and it is not too late for the BIU to terminate the transaction.

2. The microprocessor of claim 1, wherein the second-level cache comprises a prefetch cache configured to speculatively prefetch cache lines from the external memory.

3. The microprocessor of claim 1, wherein the second-level cache is further configured to generate a miss response to the second request, wherein the first-level cache is configured to generate a third request to the BIU to fetch the cache line from the external memory in response to the miss response.

4. A method for caching data in a microprocessor configured to access an external memory, the microprocessor having a first-level cache, a second-level cache, and a bus interface unit (BIU) configured to interface the first-level and second-level caches to a bus used to access the external memory, the method comprising:
    generating, by the second-level cache, a first request to the BIU to fetch a cache line from the external memory;
    detecting, by the second-level cache, that the first-level cache has subsequently generated a second request to the second-level cache for the same cache line;
    requesting, by the second-level cache, the BIU to refrain from performing a transaction on the bus to fulfill the first request if the BIU has not yet been granted ownership of the bus to fulfill the first request;
    wherein the request to refrain from performing the transaction includes a request to terminate the transaction on the bus if the BIU has already been granted ownership of the bus acid it is not too late for the BIU to terminate the transaction.

5. The method of claim 4, wherein the second-level cache comprises a prefetch cache configured to speculatively prefetch cache lines from the external memory.

6. The method of claim 4, further comprising:
generating, by the second-level cache, a miss response to the second request; and
generating, by the first-level cache, a third request to the BIU to fetch the cache line from the external memory in response to the miss response.

7. A computer program product encoded in at least one non-transitory computer readable storage medium for use with a computing device, the computer program product comprising:
computer readable program code embodied in said medium, for specifying a microprocessor configured to access an external memory, the computer readable program code comprising:
first program code for specifying a first-level cache;
second program code for specifying a second-level cache; and
third program code for specifying a bus interface unit (BIU), configured to interface the first-level and second-level caches to a bus used to access the external memory, wherein the BIU is configured to prioritize requests from the first-level cache above requests from the second-level cache;
wherein the second-level cache is configured to:
generate a first request to the BIU to fetch a cache line from the external memory;
detect that the first-level cache has subsequently generated a second request to the second-level cache for the same cache line;
request the BIU to refrain from performing a transaction on the bus to fulfill the first request if the BIU has not yet been granted ownership of the bus to fulfill the first request;
wherein the request to refrain from performing the transaction includes a request to terminate the transaction on the bus if the BIU has already been granted ownership of the bus and it is not too late for the BIU to terminate the transaction.

8. The computer program product of claim 7, wherein the second-level cache comprises a prefetch cache configured to speculatively prefetch cache lines from the external memory.

9. The computer program product of claim 7, wherein the second-level cache is further configured to generate a miss response to the second request, wherein the first-level cache is configured to generate a third request to the BIU to fetch the cache line from the external memory in response to the miss response.

10. The computer program product of claim 7, wherein the at least one computer readable storage medium is selected from the set of a disk, tape, or other magnetic, optical, or electronic storage medium and a network, wire line, wireless or other communications medium.

* * * * *